Oct. 26, 1954  L. VIAUD ET AL  2,692,480
SUPERSONIC INTERNAL CIRCULATION COMBUSTION
CHAMBER, IN PARTICULAR COMBUSTION
CHAMBER FOR AIRCRAFT JET ENGINES
Filed Dec. 2, 1948
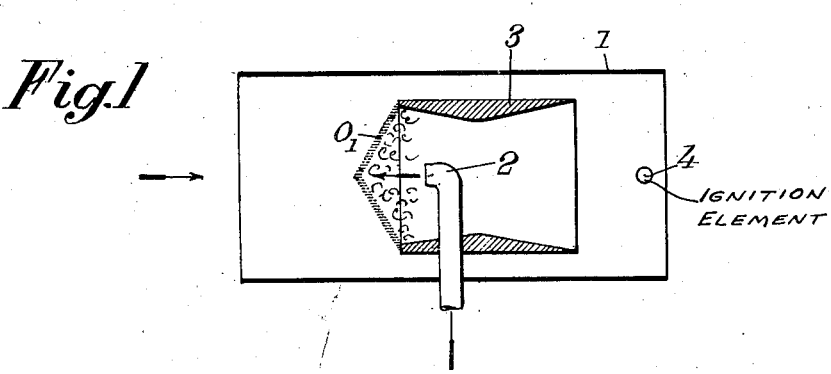
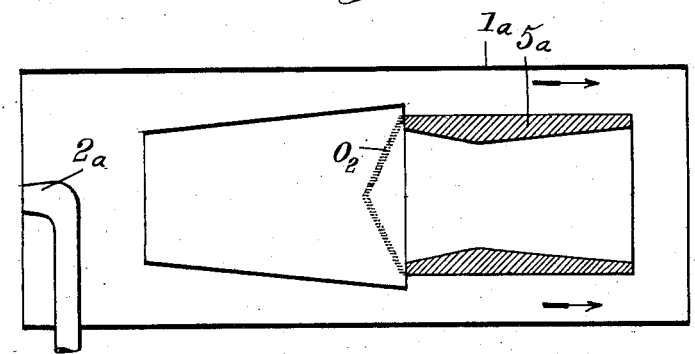
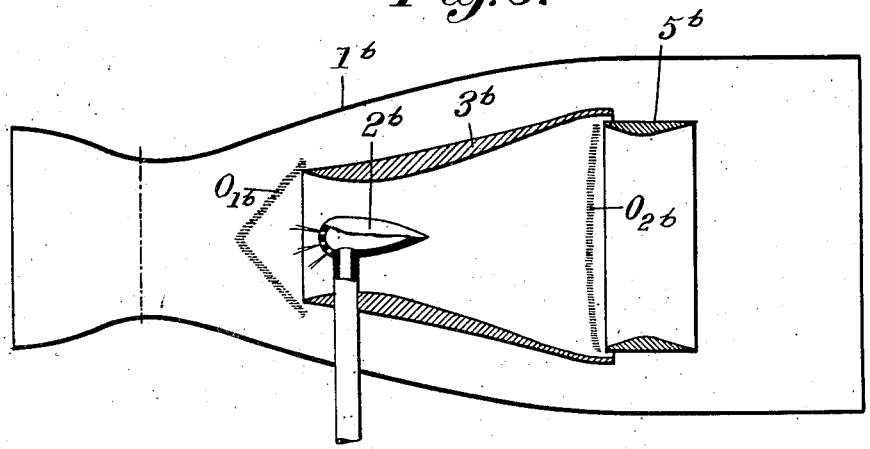
INVENTORS
LUCIEN REINGOLD
LOUIS VIAUD
BY
Roberts ATTORNEY Patented Oct. 26, 1954

2,692,480

UNITED STATES PATENT OFFICE 2,692,480

SUPERSONIC INTERNAL CIRCULATION COMBUSTION CHAMBER, IN PARTICULAR COMBUSTION CHAMBER FOR AIRCRAFT JET ENGINES

Louis Viaud and Lucien Reingold, Paris, France, assignors to Office National d'Etudes et de Recherches Aeronautiques (O. N. E. R. A.), Paris, France, a society of France Application December 2, 1948, Serial No. 63,148

Claims priority, application France May 7, 1948

6 Claims. (Cl. 60—39.72)

The present invention relates to supersonic internal circulation combustion chambers, this expression including, in what follows, any combustion chamber through which a gas stream, either continuous or pulsatory, flows at supersonic speeds in at least some regions, the thermal and kinetic energy of this stream being increased by combustion of a fuel or of a mixture of fuels introduced thereinto. The invention is more particularly but not exclusively concerned with the combustion chambers of aircraft jet engines and in particular engines of the ram jet type.

Its main object is to provide a structure of this kind which is better adapted to meet the various requirements of practice than those existing at this time.

A first feature of our invention consists, in a device of the type in question including at least one duct certain portions of which are exposed to a gaseous stream of comburent fluid flowing at a supersonic speed, on the one hand in distributing fuel into at least one of these portions, advantageously by means of an injection nozzle mounted in counter-current direction and fed with a comburent and fuel mixture containing an excess of fuel, and, on the other hand, in producing, in the zone where this distribution of fuel takes place, a shock wave behind which a subsonic turbulent state sets in, which ensures stirring of the fuel and formation of a homogeneous inflammable mixture, said shock wave being preferably created by providing, in the stream at supersonic rate of flow, at least one duct arranged and located in such manner that the action of its leading edge on said stream gives rise to the desired shock wave.

A second feature of our invention consists, in devices of the kind in question, in making use, to ensure ignition of an inflammable gas stream in a zone where the rate of flow is supersonic, of the rise of temperature due to a suitable shock wave artificially created in said zone, for instance produced by the fact that the gaseous stream strikes at least one duct suitably located in the zone in question.

Preferred embodiments of the present invention will be hereinafter described with reference to the accompanying drawing, given merely by way of example and in which:

Figs. 1 to 3 are diagrammatic side views partly in section of three embodiments of a combustion chamber for a jet aircraft made according to our invention.

In the following description it will be supposed that this combustion chamber belongs to an aerial jet machine, for instance of the ram jet type, intended to run at supersonic speeds.

We provide, in a duct 1 exposed to the flux of surrounding air and having for instance the shape of a cylinder (Figs. 1 and 2), or, better, of a convergent-divergent nozzle (Fig. 3), at least one fuel distributing device such, for instance, as a nozzle 2.

According to the main feature of the invention, we produce, in the zone where the distribution of fuel takes place and preferably immediately ahead of the outlet of nozzle 2, a shock wave $O_1$, which will be hereinafter called "mixture wave," behind which a subsonic turbulent state sets in which ensures stirring of the fuel and formation of an inflammable homogeneous mixture.

Although we might create the mixture shock wave $O_1$ by the fact that the main air stream is struck by a jet of an air and fuel mixture too rich in fuel (and therefore uninflammable) emitted in counter-current direction through nozzle 2 with a suitable pressure, it seems preferable, as shown by Fig. 1, to surround this nozzle with a body 3, advantageously streamlined, the leading edge of which, suitably positioned with respect to the outlet of said nozzle, facilitates the formation of a stationary shock wave such as the desired mixture wave $O_1$.

We thus obtain, at the rear of mixture wave $O_1$, a homogeneous mixture the physical characteristics of uninflammability of which are clearly determined and ignition of which can be performed, in particular, according to the nature of the fuel that is used, either in the zone of distribution itself, a zone which is the seat of a rise of temperature and pressure due to the mixture shock wave, or on the downstream side of said zone, for instance by means of an ignition element 4 which is used at least at the beginning of the operation of the engine, the heating of said engine being, in some cases, sufficient subsequently to ensure self ignition of the fuel mixture in the zone of combustion (case of fuels of the kind of fuel-oil).

However, it seems preferable, in order to apply this last mentioned solution (ignition on the downstream side of the zone of formation of the inflammable mixture), to have recourse to another feature of the invention which can, possibly, be used independently of the preceding one, that is to say even if homogenizing of the inflammable mixture has not been produced by the turbulent flow existing on the downstream of a shock wave.

According to this feature, which is diagrammatically illustrated by Fig. 2 in the very general case where it is desired to ignite an inflammable mixture of air and fuel circulating at supersonic speed in an outer duct $1a$, we make use, in order to ensure ignition of said mixture, to the rise of pressure and temperature due to a shock wave $O_2$ (hereinafter designated by the expression "combustion wave") adapted, concerning the pressure and temperature variations to which it gives rise, to the physical conditions of inflammability of the mixture that is treated.

This combustion wave can be produced, for instance, by the impact of the supersonic stream on the leading edge of a duct $5a$, either streamlined or not, disposed in the region of the external channel $1a$ where it is desired to obtain ignition.

In these conditions, the inflammable mixture undergoes, when it flows past the combustion wave, a self-ignition and combustion is facilitated and develops more completely due to the existence of a subsonic turbulent zone immediately on the downstream side of said combustion wave.

Such a system of ignition can be used, in particular, every time fuels or explosives are finely pulverized or atomized in an airstream flowing at supersonic speed, or the inflammable mixture consists chiefly of oxygen and hydrogen, alcohol or another organic compound.

But there are however cases, in particular when ordinary fuels such as hydrocarbons are used, where it is of interest to combine the two features which have just been specified, that is to say to have recourse to a mixture wave $O_1$ and to a combustion wave $O_2$ independent of each other so as respectively to produce homogenizing of the mixture and ignition thereof.

For this purpose it will be advantageous to have recourse to an embodiment of the kind of that illustrated by Fig. 3, according to which we provide, in tandem-like fashion, inside external conduit $1b$, two guiding ducts intended respectively, the first one $3b$, which surrounds the injection nozzle $2b$, to create the mixture wave $O_{1b}$, and the second one $5b$, the leading edge of which is preferably located in the region of the rear outlet of the preceding body, to create the combustion wave $O_{2b}$.

Anyway, whatever be the embodiment that is adopted, such a combustion chamber has many true advantages, in particular, that of being suitable for use with any fuels, either treated or not with dopes or catalysts, and that of being very simple.

It should be noted that the supersonic gas stream flows around the body giving rise to the mixing shock wave, without passing therethrough.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. An internal combustion chamber device which comprises, in combination, at least one flow duct for circulation of a mixture of fuel and comburent gas, means for compelling a supersonic flow in said duct, means for distributing all of the fuel into said duct, means for producing a shock wave for causing ignition of said mixture in said duct downstream from said fuel distributing means, said shock wave producing means comprising, means forming an annular sleeve for the free flow of gas whereby the energy losses are reduced to a minimum the front edge of which is located on the down-stream side of said fuel distributing means in a zone where the above-mentioned mixture is substantially homogeneous, the maximum external diameter of said sleeve being smaller than the internal diameter of said duct, and said sleeve terminating in a divergent portion, whereby said front edge of the unobstructed annular sleeve produces a shockwave causing ignition of said mixture.

2. An internal combustion chamber device according to claim 1, in which a divergent element enlarging toward the downstream side is located between the means for distributing fuel and the unobstructed annular sleeve to cause a variation of the supersonic velocity of the flow.

3. An internal combustion chamber according to claim 1, in which the unobstructed annular sleeve is convergent-divergent.

4. An internal combustion chamber device which comprises, in combination, at least one flow duct for circulation of a mixture of fuel and comburent gas, means for compelling a supersonic flow in said duct, means for distributing all of the fuel into said duct, means for producing a shock wave for causing ignition of said mixture in said duct downstream from said fuel distributing means, said shock wave producing means comprising, a convergent-divergent sleeve the front edge of which is located on the downstream side of said fuel distributing means in a zone where the above-mentioned mixture is substantially homogeneous, the maximum external diameter of said sleeve being smaller than the internal diameter of said duct, whereby said front edge of the convergent-divergent sleeve produces a shockwave causing ignition of said mixture.

5. An internal combustion chamber device which comprises, in combination, a supersonic flow duct for a comburent gas, means for delivering fuel into said duct, an annular sleeve in said portion of said duct for producing a shock wave and maintaining it in the region of said duct where said fluid is distributed and means for producing in the region of said duct where the fuel and comburent mixture formed on the downstream side of said fuel distributing means flow at supersonic speed a second shock wave to cause ignition at said mixture.

6. A combustion chamber according to claim 5 in which the last mentioned means consists of annular sleeve forming a convergent-divergent passage inside said duct behind said first mentioned sleeve.

References Cited in the file of this patent

UNITED STATES PATENTS

| Number | Name | Date |
|---|---|---|
| 1,273,466 | Doble | July 23, 1918 |
| 2,487,588 | Price | Nov. 8, 1949 |
| 2,520,388 | Earl | Aug. 29, 1950 |
| 2,540,594 | Price | Feb. 6, 1951 |
| 2,547,936 | Grow | Apr. 10, 1951 |
| 2,566,319 | Deacon | Sept. 4, 1951 |

FOREIGN PATENTS

| Number | Country | Date |
|---|---|---|
| 331,292 | France | July 24, 1903 |
| 920,910 | France | Jan. 8, 1947 |